United States Patent [19]
Koether et al.

[11] Patent Number: 6,142,666
[45] Date of Patent: *Nov. 7, 2000

[54] DIAGNOSTIC SYSTEM FOR MONITORING COOKING PROFILES

[75] Inventors: Bernard G. Koether, Tequesta, Fla.; Mario G. Ceste, Sr., Wallingford, Conn.

[73] Assignee: Technology Licensing Corporation, Tequesta, Fla.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/923,276

[22] Filed: Sep. 4, 1997

Related U.S. Application Data

[63] Continuation-in-part of application No. 08/549,098, Oct. 27, 1995, Pat. No. 5,711,606.

[51] Int. Cl.[7] ............................... G01K 3/00; A23L 1/18
[52] U.S. Cl. ........................ 374/149; 374/45; 374/102; 99/324
[58] Field of Search ............................. 374/45, 102, 104, 374/107, 112, 149; 99/324, 327, DIG. 10; 219/490, 492, 494, 497, 499, 501, 506, 507, 508; 364/557, 550

[56] References Cited

U.S. PATENT DOCUMENTS

| | | |
|---|---|---|
| Re. 34,559 | 3/1994 | Mickowski ........................ 364/550 |
| 4,626,663 | 12/1986 | Tateda ............................. 219/497 |
| 4,636,949 | 1/1987 | Longabaugh ..................... 219/494 |
| 4,639,578 | 1/1987 | Payne ............................. 219/494 |
| 4,647,219 | 3/1987 | Figler et al. ..................... 374/102 |
| 4,682,012 | 7/1987 | Wolf et al. ...................... 219/490 |
| 4,788,398 | 11/1988 | Hornung ......................... 219/497 |
| 4,812,963 | 3/1989 | Albrecht et al. .................. 219/492 |
| 4,858,119 | 8/1989 | Waugh et al. .................... 219/492 |
| 4,920,948 | 5/1990 | Koether et al. .................... 99/333 |
| 4,962,299 | 10/1990 | Duborper et al. ................. 219/497 |
| 5,043,860 | 8/1991 | Koether et al. ................... 219/494 |
| 5,259,389 | 11/1993 | Muramoto et al. ................ 364/557 |
| 5,349,162 | 9/1994 | Holling ........................... 219/506 |
| 5,350,237 | 9/1994 | Hida .............................. 374/183 |
| 5,378,874 | 1/1995 | Holling et al. ................... 219/506 |
| 5,545,877 | 8/1996 | Shelton ........................... 219/497 |

*Primary Examiner*—Harshad Patel
*Attorney, Agent, or Firm*—J. de la Rosa

[57] ABSTRACT

The diagnostic system of the present invention monitors and accumulates the thermal signatures or characteristics during at least one operational mode of the cooking appliance. These thermal signatures or characteristics are collected—through the same temperature sensor used to regulate the temperature of the cooking appliance—and then stored in, for example, a look-up table. Advantageously, this may be accomplished without the need of special sensors or interface boards. The thermal signatures or characteristics may include first order or higher order temperature gradients, as well as temperature profiles. The stored thermal signatures provide a baseline from which the diagnostic system can detect and identify whether the cooking appliance is working under normal operating conditions. In an alternative embodiment, the diagnostic system monitors and accumulates the cooking profiles for either a single food product or a plurality of food products. The current cooking profile is graphically displayed and compared against the master cooking profile to flag food products that are improperly cooked or not cooked to the proper degree of doneness. Such monitoring and analysis substantially eliminates any possible health risks. Also, such master cooking profiles also provide a baseline for diagnosing between normal and faulty cooking conditions.

36 Claims, 7 Drawing Sheets

DIAGNOSTIC SYSTEM FOR MONITORING COOKING PROFILES

CROSS-REFERENCE TO RELATED APPLICATION

This is a continuation-in-part of U.S. patent application Ser. No. 08/549,098, filed Oct. 27, 1995, now U.S. Pat. No. 5,711,606 entitled "Diagnostic System For A Cooking Appliance," which is incorporated herein by reference.

TECHNICAL FIELD

The present invention relates generally to a diagnostic system, and more particularly, to a diagnostic system for detecting abnormal cooking conditions or malfunctions in a cooking appliance, as well as for monitoring the cooking parameters of the cooking appliance.

BACKGROUND OF THE INVENTION

Microprocessor based controllers have been developed in recent years to assist in the preparation of properly cooked foods. Typically, such controllers, among other things, regulate the temperature within the cooking appliance to insure that the food is cooked or baked to the proper degree of doneness. Advantageously, such controllers may use intelligent sensing and diagnostics built into the cooking appliance and coupled through an interface board to detect and identify various types of failures. See, for example, U.S. Pat. No. 5,043,860 and applicants' copending application U.S. Ser. No. 08/501211, entitled "Multiprobe Intelligent Diagnostic System For Food-Processing Apparatus" which are commonly assigned and incorporated herein by reference.

While these so-called "smart interface" boards perform excellently, they generally require the use of multiple sensors. Accordingly, although these "smart interface" boards are well-suited for modern cooking appliances, they are ill-suited for the hundreds of thousands of cooking appliances manufactured over the last twenty years that use single temperature sensors. While retrofitting these older cooking appliances with additional sensors and interface boards would solve the problem, the associated cost makes it prohibitively expensive to do so.

Accordingly, what is needed is a simple and low cost diagnostic system to diagnose that certain physical characteristics of the cooking appliance are not working properly—all without the need of special sensors and interface boards.

Also, any variation in one or more of the cooking parameters alters the quality of the cooked food product, which may pose health risks. To ensure that the food product is cooked properly, it would be further desirable to provide a method and diagnostic system for monitoring the cooking operation of the appliance which readily detects such variations in an objective manner.

SUMMARY OF THE INVENTION

The diagnostic system of the present invention monitors and accumulates the thermal signatures, profiles or characteristics during different operational modes of the cooking appliance. These thermal signatures, profiles or characteristics are collected—through the same temperature sensor used to regulate the temperature of the cooking appliance— and then stored in, for example, a look-up table. Advantageously, this may be accomplished without the need of special sensors or interface boards. The thermal signatures or characteristics may include first order or higher order temperature gradients, as well as temperature profiles, collected, for example, when the temperature of the cooking appliance is raised to a desired cooking temperature. The stored thermal characteristics or signatures provide a baseline from which the diagnostic system can detect and identify whether the cooking appliance is working under normal operating conditions.

In one exemplary embodiment, the diagnostic system of the present invention compares the measured temperature gradients collected during an operational mode of the cooking appliance with predetermined or learned minimum and/or maximum value(s) of the temperature gradient. Such minimum and maximum values may be based on any particular set of cooking conditions, including the type and model number of the cooking appliance. Moreover, so-called "fuzzy logic" may be used to identify abnormal operating conditions or malfunctions. Regardless of the logic used, if abnormal operating conditions are detected, an appropriate signal can be displayed to the user or transmitted to a remote monitoring station to effect maintenance.

In another embodiment of the present invention, the diagnostic system of the present invention alternatively monitors and accumulates the cooking profiles for either a single food product or a plurality of food products. The current cooking profile is graphically displayed and compared against the master cooking profile to flag food products that are improperly cooked or not cooked to the proper degree of doneness. Such monitoring and analysis substantially eliminates any possible health risks. Also, such master cooking profiles also provide a baseline for diagnosing between normal and faulty cooking conditions.

In this latter embodiment, a cooking bar envelope representing the lower and upper deviation limits from the master cooking profile can also be superimposed with the current cooking profile. In this manner, out-of-tolerance cooking conditions are more readily discernable to indicate faulty conditions as well as unacceptable cooked food products.

BRIEF DESCRIPTION OF THE DRAWING

The features and advantages of the present invention will become more readily apparent from the following detailed description of the invention in which like elements are labeled similarly and in which.

DETAILED DESCRIPTION

Without any loss of generality or applicability for the principles of the present invention, in some embodiments the description is directed to cooking appliances, such as fryers. It should be understood, however, that the term cooking appliance shall be understood to include deep fryers, refractory ovens, baking ovens, combination ovens, infrared ovens, rotisseries, and in general temperature control units which, for example, may be cooling units.

Figure 1:
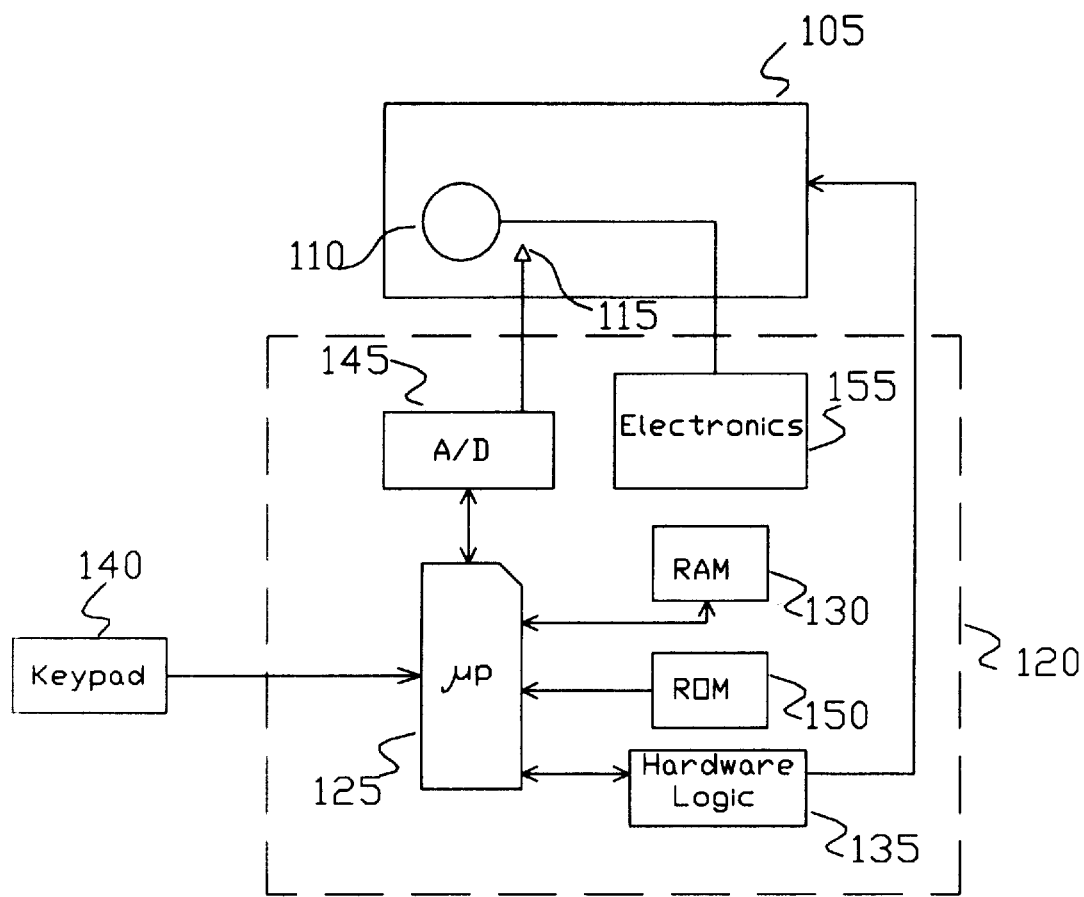
FIG. 1 is a block diagram of a cooking appliance utilizing the diagnostic system of the present invention.

A diagnostic system for use with a cooking appliance 105 having a heating element 110 and thermal probe 115 is shown in FIG. 1. Thermal probe 115 may be located in proximity to heating element 110 so as to measure the temperature at that location, and hence approximate the temperature of heating element 110, such as in an oven. Depending on the type of the cooking appliance, thermal probe 115 alternatively may be located in a location for submersion into the cooking medium, such as cooking oil. In either case, thermal probe 115 measures the temperature of the cooking medium.

A system controller 120 of cooking appliance 105 runs the diagnostic system as well as manages a number of other diagnostic and control functions. Preferably, system controller 120 uses a microprocessor 125 having a random access memory (RAM) 130 and hardware logic 135. Under program control, microprocessor 125 regulates various operations of the cooking appliance, such as, for example, the cooking time and cooking temperature for either a single food product or a plurality of food products. That is, the cooking appliance can be programmed to operate with cooking parameters tailored for a specific product. See, for example, U.S. Pat. No. 4,920,948, which is incorporated herein by reference. Those skilled in the art will readily note that such cooking parameters may be either preprogrammed at the factory or entered by a user at the time of cooking, such as through a keypad 140. Thermal probe 115 is connected to an analog-to-digital converter 145 which supplies digital signals to microprocessor 125 indicative of the temperature of heating element 110 or alternatively the cooking medium. Thermal probe 115 may be resistance temperature detectors, thermistors, thermocouples and the like. The choice of the thermal probe depends on the range of the temperatures to be measured. Microprocessor 125 processes the digital temperature signals using a program and data stored in a read-only-memory 150.

It should be understood that microprocessor 125 includes such hardware as a central processing unit, program and random access memories, timing and control circuitry, input/output (I/O) interface devices and other digital subsystems necessary to the operation of the central processing unit. Those skilled in the art will readily note that the diagnostic system of the present invention may be completely implemented using analog circuitry. The diagnostic system operates in accordance with a program whose methodology of operation is set forth below herein. This diagnostic program can be stored in conventional random-access-memory 150 or in a pre-programmed chip, such as EPROM or EEPROM. It is contemplated, however, that the diagnostic program may be disabled by depressing a key on keypad 140, if so desired.

During normal operation, system controller 120 of cooking appliance 105 regulates the percentage of time power is applied to heating element 110 in accordance with the cooking parameters selected by the user. For example, the heating element or heating elements may be pulsed with either a fixed or variable duty cycle (proportional control heating), may be fully turned on, or operated in an on/off manner similar to a thermostat, depending on the heating mode of the cooking appliance. Such techniques minimize overshoot and recovery time. The particular technique selected depends, for example, on how rapidly the selected temperature needs to be reached and the amount of overshoot that is acceptable. The particular technique used to regulate the temperature, however, is not critical to the operation of the present invention inasmuch as the invention may be used with any or all of these techniques.

Preferably, electronics 155 for thermal probe 115 may reside in system controller 120. System controller 120 may have a light emitting diode or vacuum fluorescent device display. Upon receiving the temperature data collected by thermal probe 115 during a cycle(s) or mode(s) of operation of the cooking appliance, system controller 120 automatically runs the diagnostic program in accordance with the principles of the invention. The diagnostic system of the present invention monitors and accumulates the thermal signatures or characteristics during at least one operational mode of the cooking appliance. These thermal signatures or characteristics are collected through thermal probe 115—the same probe used to regulate the temperature of the cooking appliance—and then are stored in random-access-memory 130 in the form of, for example, a look-up table. Advantageously, this is accomplished without the need of special sensors or interface boards. The thermal signatures or characteristics include first order or higher order temperature gradients or temperature profiles collected, for example, when the temperature of the cooking appliance is raised to a desired cooking temperature. For example, in a fryer, the thermal signatures or characteristics may be collected during "cold start," "melt cycle," "cooking," and/or "idle." Preferably, it is done so after the melt cycle and during idle when the cooking appliance is establishing its normal operating temperature. During that time the temperature gradient is substantially constant or fixed. The stored thermal signatures provide a baseline from which the diagnostic system can detect and identify whether the cooking appliance is working under normal operating conditions.

Figure 2:
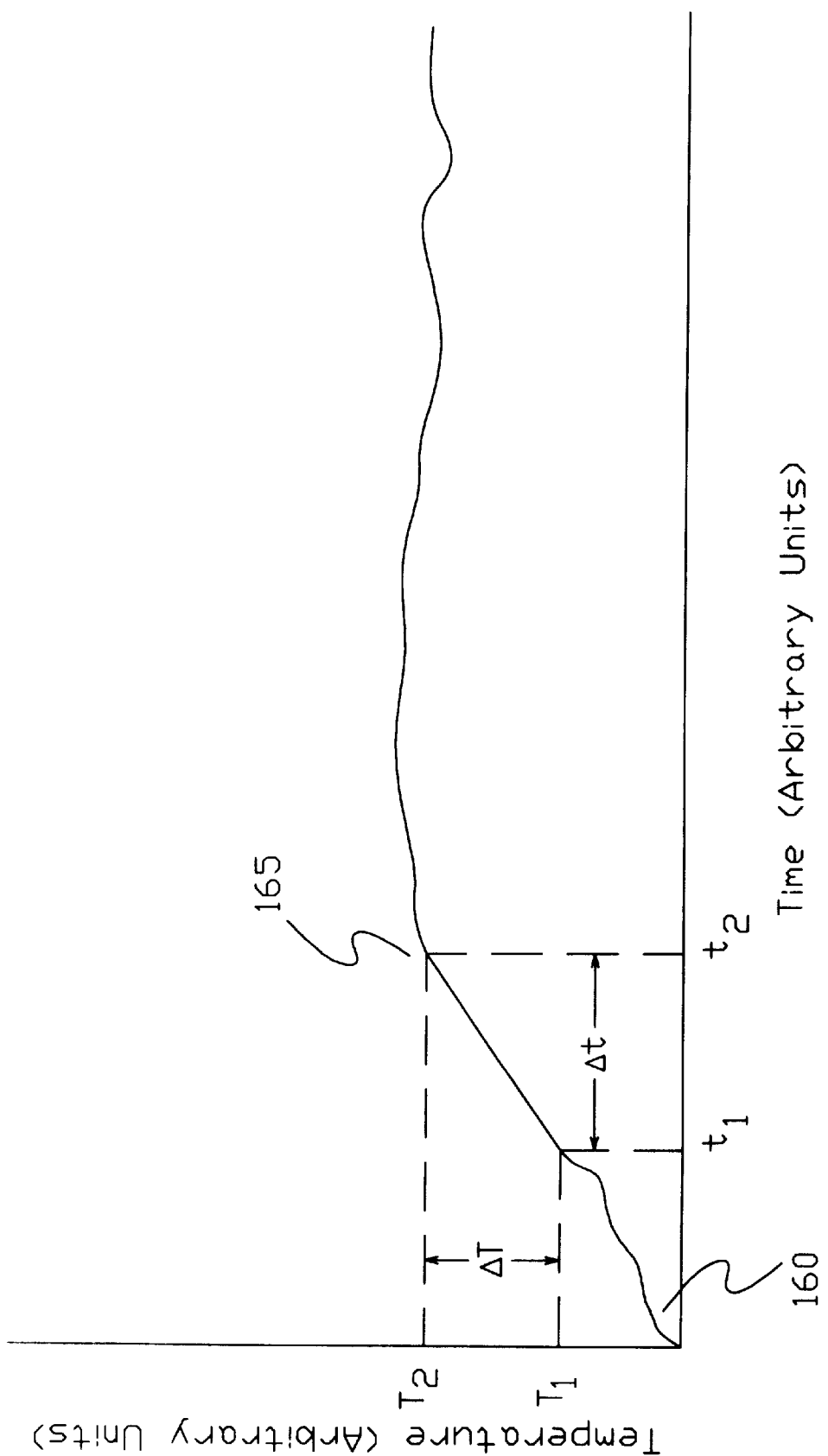
FIG. 2 is a plot of temperature versus time for a typical cooking appliance.

Referring to FIG. 2, in one exemplary embodiment, the diagnostic system of the present invention monitors the temperature from cold start temperature 160 up to an operating temperature 165 of the cooking appliance. Then, the diagnostic system calculates the thermal gradient during the time heating element 110 is fully on by determining the differential change in temperature, $\Delta T = T_2 - T_1$, during the time $\Delta t = t_2 - t_1$. In as much as the microprocessor regulates the amount and the manner in which power is applied to the heating element, it is relatively straightforward to measure the temperature at different portions of the temperature profile of the cooking appliance, regardless of the manner in which the heating element is controlled.

Those skilled in the art will also readily note that the time, $\Delta t$, may be tracked through the use of software counters. The quantity $\Delta T/\Delta t$, however, is the first order thermal gradient. The calculated temperature gradient is then compared with predetermined or learned minimum and/or maximum values of the temperature gradient. Such minimum and maximum values are usually determined empirically from a cooking appliance known to function properly and may be based on any particular set of cooking conditions, including the type and model number of the cooking appliance.

Alternatively, in another embodiment, the temperature profile(s)—that is, its shape—or any portion thereof is measured and stored. The temperature profile varies according to the particular malfunction. Once the temperature profiles are empirically determined for known malfunctions, subsequent temperature profiles may be matched to those associated with particular malfunctions for identification.

Figure 3:
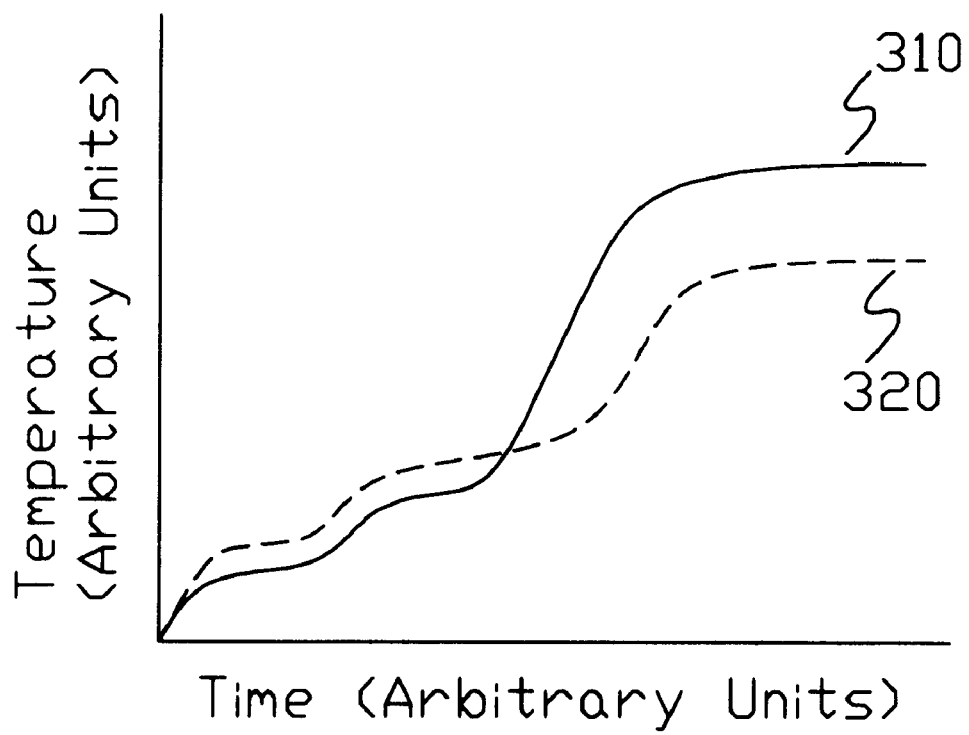
FIG. 3 is a plot of the temperature characteristics or profiles of a cooking appliance.

Referring to FIG. 3, thermal profiles 310 and 320 for a cooking appliance that is operating properly and improperly, respectively, are depicted. Thermal profile 310 may be saved and stored in the memory of microprocessor 125 as training data. Accumulation of the thermal profiles for different malfunctions, such as faulty heating elements and electronics, provides a baseline for diagnostic purposes. Such training data may be used to teach the diagnostic system to diagnose between normal and abnormal operating conditions.

Factors that may affect the measured temperature gradient or temperature profile include: gas pressure and available BTU energy; electrical voltage; amount and type of cooking medium in the cooking appliance; and/or malfunctioning heating elements or heat exchangers. Any improper operation in the heating manifest itself as a variation in the temperature gradient or temperature profile outside the normal range of operations. It is contemplated that in certain instances, higher order temperature gradients may be used where the desired temperature profile or a portion thereof is not substantially linear, such as during proportional control heating. If the diagnostic program determines that the measured temperature characteristics, such as the temperature gradient, are outside the normal operating range, an appropriate signal—either audible or visual—can be displayed to the user or transmitted, including by wireless means, to a remote monitoring station to effect maintenance. For example, the communication system of U.S. Pat. No. 4,812,963, which is incorporated herein by reference, may be used to provide real-time diagnostic information to a remote station. In that latter instance, the remote monitoring station may interrogate the cooking appliance for additional information and then make an independent judgment as to the necessity of repair.

It is contemplated that the present diagnostic system will monitor and accumulate the thermal characteristics of the cooking appliance from cold start through its operation during the day until shut down. During that period, the diagnostic system can statistically determine—based on collected thermal data—the performance of the cooking appliance. Minor deviations may be recorded and stored in memory or in a file to later provide a temperature profile history to assist a technician in serving the appliance, if a later failure occurs. If the deviation, however, is gross, it may display to the operator a message warning that the cooking appliance is unacceptable for cooking purposes. If desired, the diagnostic system may be programmed in the latter case to disable the cooking appliance to eliminate any possible health risks.

In addition, acceptable values for the temperature gradients for different cycles or modes of operation of the cooking appliance can be stored in the look-up table. For example, when the heating element is either pulsed at fixed or variable duty cycles the corresponding acceptable temperature gradients or profiles can be stored and then compared with the measured gradients or profiles. As the cooking appliance ages, the acceptable values can also be updated so as to accommodate this change. This updating can be effected through the use of a portable computer that downloads to the system controller the acceptable values for the thermal characteristics. Alternatively, the diagnostic system can be programmed to learn or determine, for example, its own maximum or minimum values for the temperature gradient based on the past operating conditions of the cooking appliance. That is, the diagnostic system learns what the normal range of values should be. Various programming techniques for effecting this latter methodology are well known in the art and may include the use of statistics, such weight averaging, standard deviation and the like, as well as artificial intelligence or logic called "fuzzy-logic."

In results from experiment practice using 14" Pitco gas and electric fryers manufactured by Blodgett, Inc., the acceptable temperature gradient ranges were determined empirically for the cooking appliance. Some exemplary values are tabulated below:

| 14" Pico Fryer ΔT = 250–300° F. | | | |
|---|---|---|---|
| Normal Time Range Δt (sec) | | Normal Gradient Range ΔT/Δt (° F./sec) | |
| Electric | Gas | Electric | Gas |
| 91 | 116 | 0.55 | 0.43 |
| 85 | 73 | 0.59 | 0.68 |
| 101 | 110 | 0.50 | 0.45 |
|  | 112 |  | 0.45 |
|  | 98 |  | 0.51 |
|  | 97 |  | 0.52 |

From the above, the temperature gradient ranges were 0.50–0.59 (° F./sec) and 0.43–0.68 (° F./sec) for the electric and gas fryers, respectively. After additional data collection, however, it was empirically determined that the normal average temperature gradients were 0.53 (° F./sec) and 0.47 (° F./sec) for the electrical and gas fryers, respectively. Failures occurred at temperature gradients below 0.36 (° F./sec) and 0.35 (° F./sec) for the electric and gas fryers, respectively. As such, the diagnostic system of the present invention indicated malfunctions in several fryers having a temperature gradient below these empirically determined minimum temperature gradients. Upon inspecting those fryers, they had either defective heating element(s) or improper line voltages to the heating element. Although it is typically the case that the malfunction is associated with a temperature gradient that is too low, it should be understood that a temperature gradient that is too high will also be indicative of a malfunction.

In accordance with the principles of the invention, it is further contemplated that the diagnostic system of the present invention may alternatively monitor and accumulate the cooking profiles for either a single food product or a plurality of food products. The term cooking profile has been employed in connection with cooking appliance controllers to denote the setting of various cooking parameter(s) during different portions of the cooking cycle, which parameters include temperature, pressure, volumetric flow rate, humidity setting, and the like. See, for example, U.S. Pat. No. 4,920,948, which is incorporated herein by reference.

Figure 4:
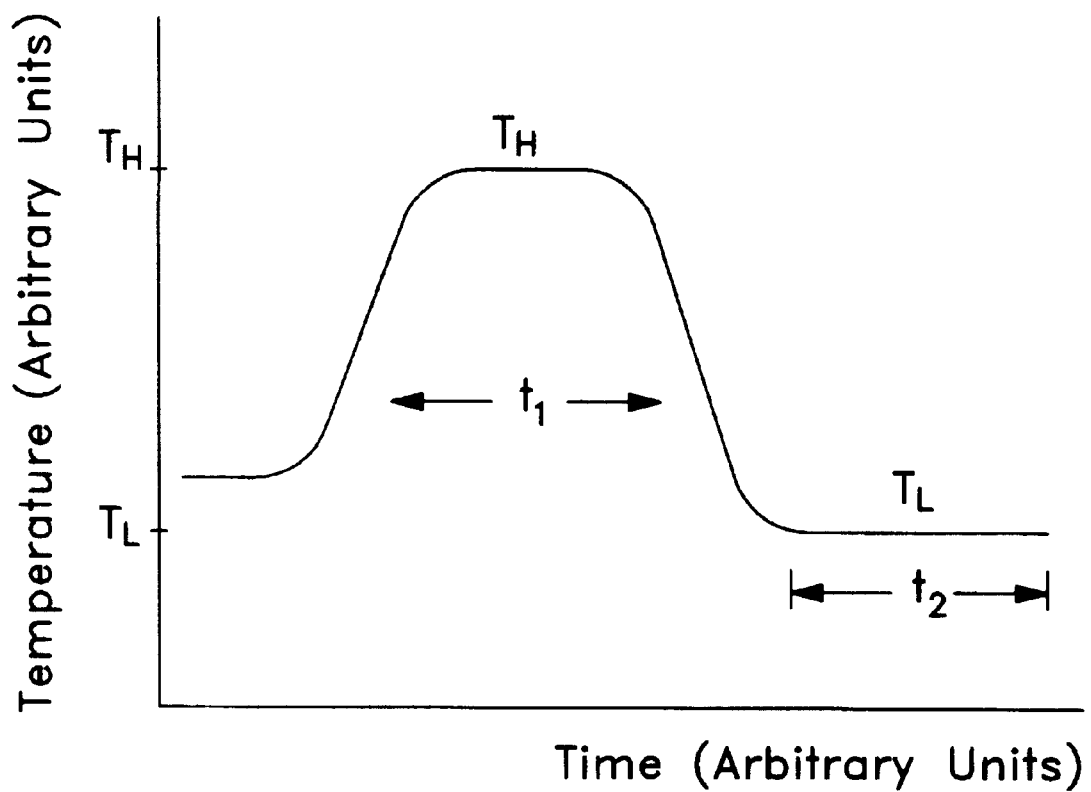
FIG. 4 is an illustrative cooking profile with temperature as the cooking parameter.

For example, in cooking chicken, the cooking profile may initially include a relatively high cooking temperature ($T_H$) for an amount of time, $t_1$, and then a relatively low temperature ($T_L$) for an amount of time, $t_2$, as illustrated in FIG. 4. Furthermore, it can be prepared under pressurized or non-pressurized cooking conditions. The availability of a relatively large number of cooking profiles is desirable because many establishments use the same cooking appliance to prepare the same food product in several different ways. Also, varying the amount of the particular food product that is to be cooked results in different cooking profiles, for example, different cooking times.

Figure 5:
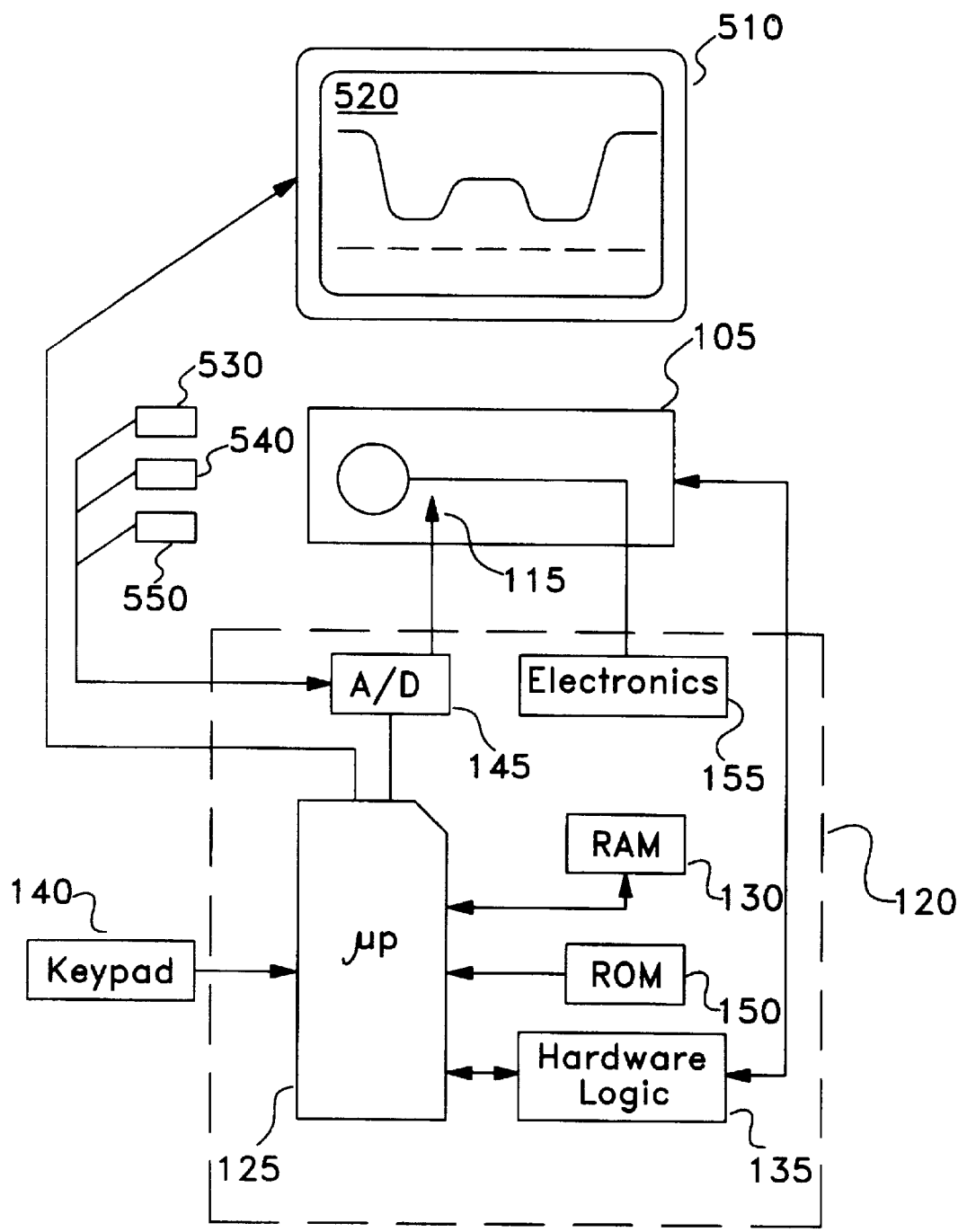
FIG. 5 is a block diagram of a cooking appliance utilizing another embodiment of the diagnostic system of the present invention.

Referring to FIG. 5, in this latter alternative embodiment of the present invention, the diagnostic system further employs a display system 510, such as a CRT or LCD, to graphically display the cooking profile stored in memory for the particular food product that is being cooked. An illustrative display of a typical cooking profile 520 representative of the cooking temperature as a function of time is shown on display system 510. It should be clearly understood that in a likewise manner, the pressure, humidity setting, and/or air flow rate, can also be displayed, if appropriate, either concurrently or at different times. This cooking profile represents a master cooking profile defined as the idealized cooking profile.

Such master cooking profiles provide a baseline for diagnosing between normal and faulty cooking conditions. As discussed more fully herein below, the master cooking profile is used specifically for comparison purposes with the current cooking profile defined as the profile received by the microprocessor during an actual cooking cycle. Importantly, monitoring the current cooking profile against the master cooking profile flags food products that are improperly cooked or not cooked to the proper degree of doneness. Such monitoring and analysis substantially eliminates any possible health risks.

During normal operation, system controller 120 monitors and accumulates the actual or current cooking profile of the food product that is being cooked. Thermal probe 115 provides temperature data to microprocessor 125, while probes 530, 540 and 550 provide pressure, air flow rate, and humidity data, respectively. More particularly, each probe 115, 530, 540 and 550 collects data consisting of temperature, pressure, air flow rate and humidity, respectively, vis-a-vis A/D 145 as a function of time during a cooking cycle of the cooking appliance. Microprocessor 125 is connected to display system 510 for graphically displaying the data collected by probes 115, 530, 540 and 550. Application specific software to effect such graphical displays may be readily realized by those skilled in the art and who have been equipped with understanding of the present invention as set forth herein.

Figure 6:
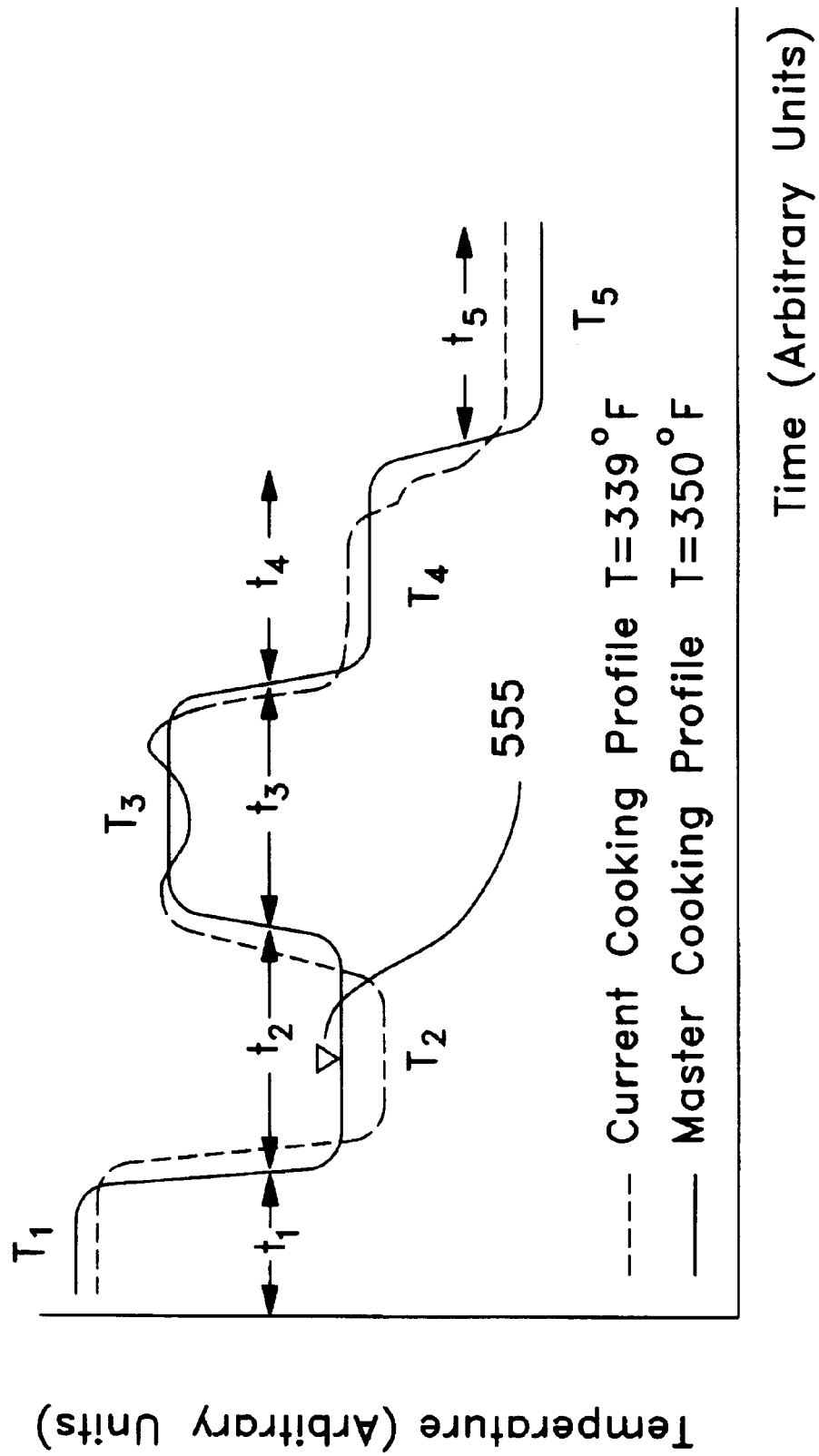
FIG. 6 is an illustrative display of the current cooking profile superimposed with the master cooking profile.

Show in FIG. 6 are illustrative master and current cooking profiles superimposed for comparison purposes. The master cooking profile is stored in memory and any number of such master profiles may be stored so as to constitute a library of master cooking profiles. By providing the ability to superimpose the master cooking profile over the current cooking profile, a nontechnically trained person can readily discern faulty cooking conditions and identify the cooking cycle as acceptable or good. Furthermore, it also becomes more readily apparent to trained personnel where and to what extent the faulty cooking conditions are.

If desired, a cursor 555 may be provided on the display which may be positioned over any portion of the graphic display of the cooking profile. The specific values and of the cooking parameters corresponding to the location of cursor 555 may be displayed (master cooking profile, T=350° F.; current cooking profile, T=339° F.), thereby permitting the operator to readily compare cooking parameter values between the master and current cooking profiles.

Figure 7:
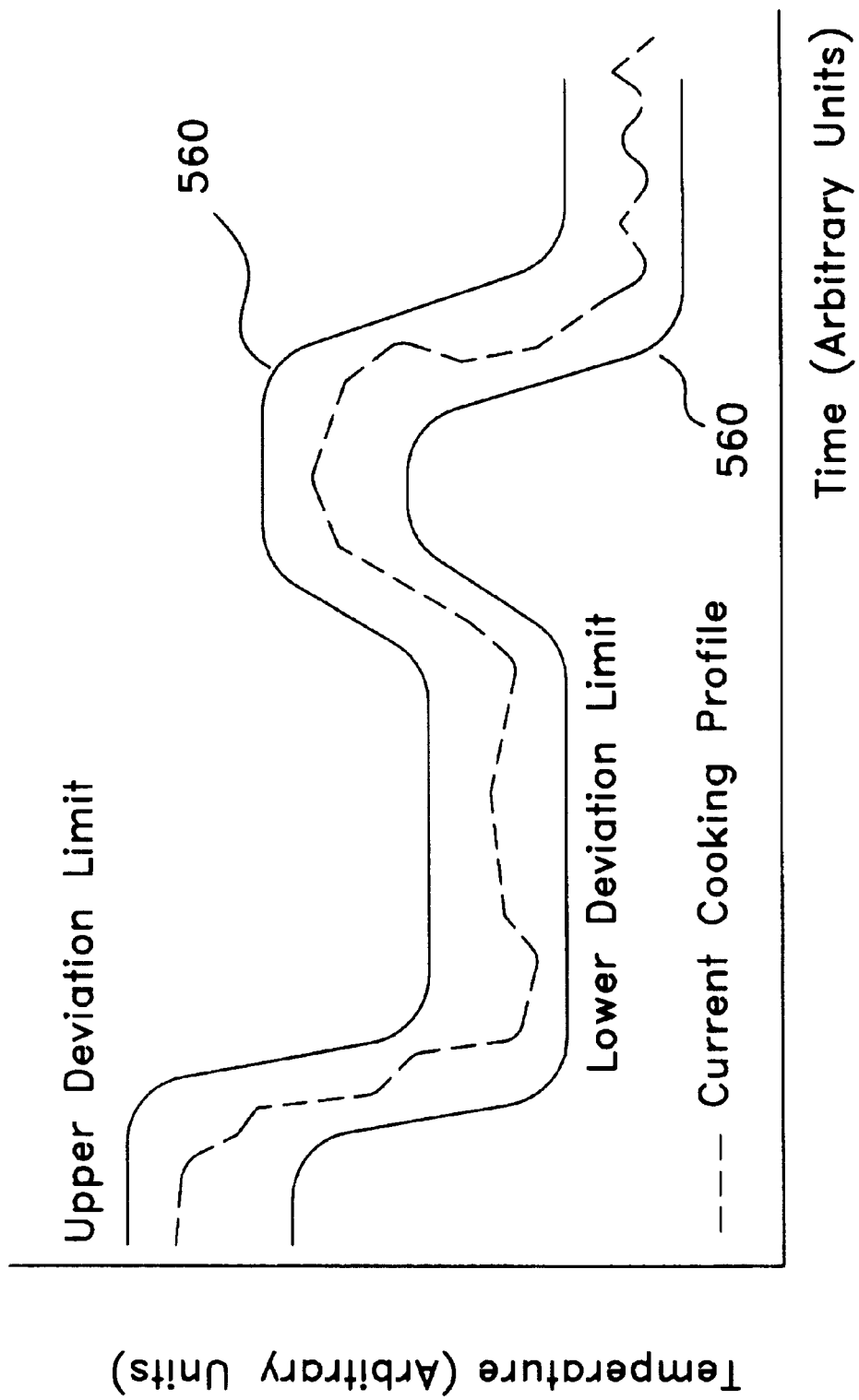
FIG. 7 is an illustrative display of the cooking bar envelope superimposed with the current cooking profile.

It is further contemplated that a cooking bar envelope 560 representing the lower and upper deviation limits from the master cooking profile can be alternatively superimposed with the current cooking profile, as shown in FIG. 7. It should be clearly understood that the horizontal axis may alternatively be pressure, humidity setting, air flow rate, or any other cooking parameter appropriate for the particular appliance. In this manner, out-of-tolerance cooking conditions, indicated from deviations in the master cooking profile, are more readily discernable. Deviation limits can be established under which the quality of the cooked food product is deemed to be acceptable. Such deviation limits may be determined empirically and may be based on the type and model of the cooking appliance, among other things. Preferably, the deviation limits may be set through the use of statistics.

System controller 120 may be readily programed to determine whether the current cooking profile is within cooking bar envelope 560, or to compare the current cooking profile against the master cooking profile. If the current cooking profile is outside preestablished limits of deviation or the cooking bar envelope, an appropriate signal—either audible or visual—can be displayed to the operator. Of course, current cooking profiles may be saved and stored in memory or on hard disk for later retrieval to assist a technician in serving the cooking appliance. If required, the cooking parameters may be automatically adjusted to match the current cooking profile to the master cooking profile using well known methods of feedback control, including the use of artificial intelligence or so-called "fuzzy-logic."

Alternatively, such current cooking profiles may be transmitted to a remote monitoring station where the faulty cooking conditions may be detected and identified using remote computers by comparing the current cooking profile against the master. It is contemplated that the communication systems of U.S. Pat. No. 4,812,963 and copending application Ser. No. 08/643,207, which are incorporated herein by reference, may be used to effect such transmission and the exchange of information necessary to integrate various aspects of accounting, billing and servicing.

As yet another alternative, the current cooking profiles may be transmitted at the time of service to a portable hand held terminal having a graphical display screen, such as a Palm/Laptop computer. Updated master cooking profiles may be stored in those hand held pocket terminals along with diagnostic software to detect and identify abnormal cooking conditions, which may affect the quality of the food product. Preestablished deviation limits may be set to denote unacceptable food products. In this latter instance of using a palm/laptop computer, master and current cooking profiles are graphically displayed on the screen of the Palm/Laptop computer for analysis by a trained technician. Such graphical displays may use menu driven software to assist in recalling, comparing and analysis the master and current cooking profiles for either a single food product or a plurality of food products.

It is understood that the embodiment herein is merely illustrative of the principles of the invention. Various modifications may be made by those skilled in the art which will embody the principles of the invention and fall within the spirit and the scope thereof.

What is claimed is:

1. A method for monitoring the operation of a cooking apparatus comprising the steps of:

defining a master cooking profile for a particular food product representing the idealized cooking profile thereof for a particular cooking parameter;

storing said master cooking profile;

acquiring data for said particular cooking parameter as a function of time as the food product is being cooked, said data representing a current cooking profile;

graphically superimposing said master and current cooking profiles on a display for monitoring purposes; and comparing said master and current cooking profiles so as to readily identify faulty cooking conditions based on said comparison.

2. The method of claim 1 wherein said cooking parameter is temperature.

3. The method of claim 1 wherein said cooking parameter is pressure.

4. The method of claim 1 wherein said cooking parameter is humidity setting.

5. The method of claim 1 wherein said cooking parameter is air flow rate.

6. The method of claim 1 further comprising the step of controlling the cooking operation of the cooking apparatus based on said comparison of the master and current cooking profiles.

7. The method of claim 1 further including the step of downloading from a computer the master cooking profile.

8. The method of claim 1 further including the steps of transmitting the current cooking profile to a computer, and said computer graphically displaying said current cooking profile against a stored master cooking profile.

9. The method of claim 8 wherein said computer is a hand held terminal having a graphical display screen.

10. The method of claim 9 wherein said hand held terminal is a Palm/Laptop computer.

11. The method of claim 1 further including the steps of generating a cursor on said display along a portion of said master and current cooking profiles, and displaying the values of the cooking parameters corresponding to the location of the cursor on the master and current cooking profiles.

12. The method of claim 1 further including the step of determining whether said current cooking profile is within preestablished deviation limits from said master cooking profile.

13. The method of claim 12 further including the step of graphically displaying said preestablished deviation limits as a cooking bar envelope on said display.

14. A method for monitoring the operation of a cooking apparatus comprising the steps of:

acquiring a master cooking profile for a particular food product representing the idealized cooking profile thereof for a particular cooking parameter;

acquiring data for said particular cooking parameter as a function of time so as to constitute a current cooking profile;

graphically superimposing and displaying the master and current cooking profiles; and comparing said master and current cooking profiles so as to readily determine whether the food product was cooked under acceptable cooking conditions.

15. The method of claim 14 further including the step of determining whether said current cooking profile is within preestablished deviation limits from said master cooking profile.

16. The method of claim 15 further including the step of graphically displaying said preestablished deviation limits as a cooking bar envelope together with said current cooking profile.

17. The method of claim 14 wherein said cooking parameter is temperature.

18. The method of claim 14 wherein said cooking parameter is pressure.

19. The method of claim 14 wherein said cooking parameter is humidity setting.

20. The method of claim 14 wherein said cooking parameter is air flow rate.

21. The method of claim 14 further comprising the step of controlling the cooking operation of the cooking apparatus based on the comparison of said master and current cooking profiles.

22. The method of claim 14 further including the step of downloading from a computer the master cooking profile.

23. The method of claim 14 further including the steps of transmitting the current cooking profile to a computer, and said computer graphically displaying said current cooking profile against a stored master cooking profile.

24. The method of claim 14 further including the steps of transmitting the current cooking profile to a computer, and said computer graphically displaying said current cooking profile with a cooking bar envelope representing preestablished deviation limits from said master cooking profile.

25. The method of claim 24 wherein said computer is a hand held terminal having a graphical display screen.

26. The method of claim 24 wherein said hand held terminal is a Palm/Laptop computer.

27. An apparatus for monitoring the operation of a cooking apparatus comprising:

means for acquiring a master cooking profile for a particular food product representing the idealized cooking profile thereof for a particular cooking parameter;

memory for storing said master cooking profile;

means for acquiring data for said particular cooking parameter as a function of time as the food product is being cooked, said data representing a current cooking profile;

display means for graphically superimposing said master and current cooking profiles for monitoring purposes; and means for comparing said master and current cooking profiles so as to readily identify faulty cooking conditions based on said comparison.

28. The apparatus of claim 27 wherein said means for acquiring includes a temperature sensor.

29. The apparatus of claim 27 wherein said means for acquiring includes a pressure sensor.

30. The apparatus of claim 27 wherein said means for acquiring includes an air flow rate sensor.

31. The apparatus of claim 27 wherein said means for acquiring includes a humidity sensor.

32. The apparatus of claim 27 wherein said master cooking profile is downloaded from a computer.

33. The apparatus of claim 32 wherein said computer is a hand held terminal having a graphical display screen.

34. The apparatus of claim 33 wherein said hand held terminal is a Palm/Laptop computer for graphically displaying said current cooking profile against a stored master cooking profile.

35. The apparatus of claim 27 further including means for graphically displaying preestablished deviation limits from said master cooking profile along with said current cooking profile.

36. The apparatus of claim 35 wherein said deviation limits are in the form of a cooking bar envelope.

* * * * *